(12) United States Patent
Sajdak et al.

(10) Patent No.: US 11,528,153 B1
(45) Date of Patent: Dec. 13, 2022

(54) SYSTEMS AND METHODS FOR DELAYED-MESSAGE ATTACK MITIGATION

(71) Applicant: VOUCH.IO LLC, Atlanta, GA (US)

(72) Inventors: Kristof Sajdak, Atlanta, GA (US); Thomas Anthony Maley, Atlanta, GA (US)

(73) Assignee: VOUCH.IO LLC, Atlanta, GA (US)

( * ) Notice: Subject to any disclaimer, the term of this patent is extended or adjusted under 35 U.S.C. 154(b) by 0 days.

(21) Appl. No.: 17/827,352

(22) Filed: May 27, 2022

(51) Int. Cl.
*H04L 29/06* (2006.01)
*H04L 9/32* (2006.01)
*H04L 9/08* (2006.01)

(52) U.S. Cl.
CPC .......... *H04L 9/3297* (2013.01); *H04L 9/0825* (2013.01); *H04L 9/3273* (2013.01); *H04L 2209/80* (2013.01); *H04L 2209/84* (2013.01)

(58) Field of Classification Search
None
See application file for complete search history.

(56) References Cited

U.S. PATENT DOCUMENTS

| | | | | |
|---|---|---|---|---|
| 8,566,248 B1 * | 10/2013 | Steele | ................ | H04L 67/02 705/325 |
| 9,185,094 B2 * | 11/2015 | Ivanchykhin | ........ | H04N 21/835 |
| 10,966,088 B1 * | 3/2021 | Belton, Jr. | .......... | H04W 12/069 |
| 11,323,430 B2 * | 5/2022 | Liao | .................... | G07C 9/00571 |
| 2002/0019985 A1 * | 2/2002 | Fuccello | ................. | G06F 1/181 725/91 |

(Continued)

OTHER PUBLICATIONS

Liu, Xin et al. A fingerprint-based user authentication protocol with one-time password for wireless sensor networks. Proceedings of 2013 International Conference on Sensor Network Security Technology and Privacy Communication System. https://ieeexplore.ieee.org/stamp/stamp.jsp?tp=&arnumber=6553825 (Year: 2013).*

(Continued)

*Primary Examiner* — Jeremiah L Avery
(74) *Attorney, Agent, or Firm* — Morris, Manning & Martin, LLP; Daniel E. Sineway, Esq.; Adam J. Thompson, Esq.

(57) ABSTRACT

A computer-implemented method comprising: establishing, by an operation device, a wireless communication with a remote device; authenticating, by the operation device, the wireless communication with the remote device; receiving, at the operation device, a first command to perform a first operation; establishing a first maximum delay period using an estimated time delay, wherein the estimated time delay comprises an authentication delay, an encryption delay, or a combination thereof; determining, by the operation device, that the first command is received within a first maximum delay period; performing, by the operation device, the first operation; receiving, at the operation device, a second command to perform a second operation; establishing a second maximum delay period using the estimated time delay; determining, by the operation device, that the second command is received within a second maximum delay period; and performing, by the operation device, the second operation instructed in the second command.

20 Claims, 5 Drawing Sheets

(56) References Cited

U.S. PATENT DOCUMENTS

| | | | | |
|---|---|---|---|---|
| 2006/0179003 A1* | 8/2006 | Steele | ............... | G06Q 30/02 |
| | | | | 705/59 |
| 2006/0200425 A1* | 9/2006 | Steele | ............... | G06Q 20/382 |
| | | | | 705/64 |
| 2007/0143827 A1* | 6/2007 | Nicodemus | ............... | H04L 63/102 |
| | | | | 726/2 |
| 2011/0321146 A1* | 12/2011 | Vernon | ............... | G06F 21/35 |
| | | | | 726/7 |
| 2013/0230171 A1* | 9/2013 | Ivanchykhin | ............... | H04N 21/6334 |
| | | | | 380/255 |
| 2020/0312072 A1* | 10/2020 | Myers | ............... | G07C 9/00857 |
| 2021/0051005 A1* | 2/2021 | Kunz | ............... | H04W 12/033 |
| 2022/0240103 A1* | 7/2022 | Gummadi | ............... | H04W 88/14 |

OTHER PUBLICATIONS

Matsunaka, Takashi et al. An Effective Authentication Procedure Considering User Expiry Time During Handover. 2006 IEEE 17th International Symposium on Personal, Indoorand Mobile Radio Communications, https://ieeexplore.ieee.org/stamp/stamp.jsp?tp=&arnumber=4022432 (Year: 2006).*

* cited by examiner

SYSTEMS AND METHODS FOR DELAYED-MESSAGE ATTACK MITIGATION

TECHNICAL FIELD

The present disclosure relates generally to systems and methods for mitigating delayed-message attacks in digital communications, and more particularly to detecting potential delayed-message attacks of digital key lock systems.

BACKGROUND

Internet of things (IoT) devices have been an integral part of society. With virtually every electronic device communicating over some network variation, security has been an important factor for maintaining the functionality of IoT systems. Hackers have increasingly discovered ways to circumvent security features by devising new hacking techniques. One hacking technique, called delayed-message attacks, focuses on IoT devices and other wirelessly operating security systems.

The hacking technique is simple; an actor (or hacker) creates a man in the middle (MITM) device that is designed to intercept signals produced by authorized systems. When a user with an authorized device attempts to unlock a wireless locking mechanism, the MITM device receives the unlocking signal and withholds the signal from reaching the wireless locking mechanism. Once the user deems the locking mechanism unresponsive, the user abandons the area allowing the actor to release the message and gain access to whichever device was being unlocked by the user.

Therefore, there is a long felt and unresolved need for systems and methods that mitigate delayed-message attacks.

BRIEF SUMMARY OF THE DISCLOSURE

Briefly described, and according to one embodiment, aspects of the present disclosure generally relate to systems and methods for mitigating delayed-message attacks. In various embodiments, mitigating delayed-message attacks traditionally employ changes to protocols, which require increased performance from the operating systems. In other embodiments, mitigating delayed-message attacks can be protocol specific and hard to implement on a large scale. In at least one embodiment, the present method is protocol agnostic and does not drastically increase the computing requirements of the system.

In one or more embodiments, the disclosed method mitigates delayed-message attacks. In various embodiments, a first authorized device and a second authorized device authenticate a communication at specific points in time. In some embodiments, the first authorized device and the second authorized device save authentication timestamps associated with when the communication is authenticated. Once the communication between the two devices is authenticated, the first authorized device may send an encrypted command to the second authorized device. In various embodiments, the first authorized device records and saves a first timestamp indicating when the first authorized device sends the encrypted command, and the second authorized device records and saves a second timestamp indicating when the second authorized device receives the encrypted command.

In one or more embodiments, the first authorized device embeds the timestamps into the encrypted command sent to the second authorized device. In particular embodiments, the second authorized device can calculate, based on the timestamps received from the first authorized device and its own recorded timestamps, if the encrypted command is intentionally delayed. In some embodiments, if the encrypted command is delayed, the second authorized device will deny access to the system or ignore the command received from the first authorized device. In other embodiments, if the encrypted command is not delayed, the second authorized device will grant access to the system or execute the command received from the first authorized device. In various embodiments, the second authorized device can deny a first request to unlock, as the first request is delayed and can approve a second request sent after the first request to unlock, as the second request is not delayed.

According to a first aspect, a computer-implemented method comprising: A) establishing, by an operation device, a wireless communication link with a remote device; B) authenticating, by the operation device, the wireless communication link with the remote device; C) receiving, at the operation device, a first command to perform a first operation; D) establishing a first maximum delay period using an estimated time delay for transmitting messages between the remote device and the operation device, wherein the estimated time delay comprises an authentication delay, an encryption delay, or a combination thereof; E) determining, by the operation device, that the first command is received within a first maximum delay period; F) in response to determining that the first command is received within the first maximum delay period, performing, by the operation device, the first operation; G) receiving, at the operation device, a second command to perform a second operation; H) establishing a second maximum delay period using the estimated time delay; I) determining, by the operation device, that the second command is received within a second maximum delay period; and J) in response to determining that the second command is received within the second maximum delay period, performing, by the operation device, the second operation instructed in the second command.

According to a further aspect, the computer-implemented method of the first aspect or any other aspect, wherein the first maximum delay period is further established by adding the estimated time delay to a first time difference of the remote device between an authentication timestamp of the remote device and a first command transmission timestamp of the remote device, wherein the authentication timestamp and the first command transmission timestamp are received at the operation device with the first command.

According to a further aspect, the computer-implemented method of the first aspect or any other aspect, wherein the second maximum delay period is further established by adding the estimated time delay to a second time difference of the remote device between the authentication timestamp of the remote device and a second command transmission timestamp of the remote device, wherein the authentication timestamp and the second command transmission timestamp are received at the operation device with the second command.

According to a further aspect, the computer-implemented method of the first aspect or any other aspect, wherein a first clock of the operation device that is used to determine that the first command is received within the first maximum delay period is asynchronous with a second clock of the remote device used to generate the authentication timestamp.

According to a further aspect, the computer-implemented method of the first aspect or any other aspect, wherein the operation device comprises a digital key lock of a vehicle.

According to a further aspect, the computer-implemented method of the first aspect or any other aspect, wherein the wireless communication link is established using Bluetooth Low Energy (BLE) communication protocols, ultra-wideband (UWB) communication protocols, Wi-Fi communication protocols, or a combination thereof.

According to a further aspect, the computer-implemented method of the first aspect or any other aspect, wherein the first command and the second command are encrypted using a key agreement protocol established while authenticating the wireless communication link with the remote device.

According to a further aspect, the computer-implemented method of the first aspect or any other aspect, wherein the key agreement protocol comprises a transport layer security (TLS) protocol, a secure socket layer (SSL) protocol, Hypertext Transfer Protocol Secure (HTTPS), a Noise protocol, or a combination thereof.

According to a further aspect, the computer-implemented method of the first aspect or any other aspect, wherein the first command and the second command are transmitted during the same encryption session.

According to a second aspect, a system comprising: A) a processor; and B) a non-transitory, computer-readable medium comprising instructions that, when executed by the processor, cause the processor to: 1) establish a wireless communication link with a remote device; 2) authenticate the wireless communication link with the remote device; 3) receive a command to perform a first operation; 4) determine that the command is received after a maximum delay period; and 5) in response to determining that the command is received after the maximum delay period, fail the command.

According to a further aspect, the system of the second aspect or any other aspect, wherein the instructions are further executable by the processor to cause the processor to: A) in response to determining that the command is received after the maximum delay period, remove the wireless communication link with the remote device.

According to a further aspect, the system of the second aspect or any other aspect, wherein failing the command comprises not executing command instructions provided in the command.

According to a further aspect, the system of the second aspect or any other aspect, further comprising: A) a digital key locking mechanism of a vehicle, wherein the digital key locking mechanism is configured to lock or unlock the vehicle in response to receiving the command within the maximum delay period.

According to a further aspect, the system of the second aspect or any other aspect, wherein the instructions are further executable by the processor to cause the processor to: A) establish the maximum delay period using an estimated time delay for receiving messages from the remote device, wherein the estimated time delay comprises an authentication delay, an encryption delay, or a combination thereof.

According to a further aspect, the system of the second aspect or any other aspect, wherein the maximum delay period is further established by adding the estimated time delay for transmitting messages to a time difference of the remote device between an authentication timestamp of the remote device and a command transmission timestamp of the remote device, wherein the authentication timestamp and the command transmission timestamp are received with the command.

According to a third aspect, a non-transitory computer-readable medium having program code that is stored thereon, the program code executable by one or more processing devices for performing operations comprising: A) establishing a wireless communication link with a remote device; B) authenticating the wireless communication link with the remote device; C) receiving a first command to perform a first operation; D) determining that the first command is received after a first maximum delay period; and E) in response to determining that the first command is received after the first maximum delay period, controlling performance of the first operation.

According to a further aspect, the non-transitory computer-readable medium of the third aspect or any other aspect, wherein the operations further comprise: A) receiving a second command to perform a second operation; B) determining that the second command is received after a second maximum delay period; and C) in response to determining that the second command is received after the second maximum delay period, failing the second command.

According to a further aspect, the non-transitory computer-readable medium of the third aspect or any other aspect, wherein the operations further comprise: A) establishing the first and second maximum delay periods using an estimated time delay for receiving messages from the remote device, wherein the estimated time delay comprises an authentication delay, an encryption delay, or a combination thereof.

According to a further aspect, the non-transitory computer-readable medium of the third aspect or any other aspect, wherein the first command is encrypted using a key agreement protocol established while authenticating the wireless communication link with the remote device.

According to a further aspect, the non-transitory computer-readable medium of the third aspect or any other aspect, wherein the operations further comprise: A) establishing the first maximum delay period using an estimated time delay for receiving messages from the remote device and adding the estimated time delay for transmitting messages to a time difference of the remote device between an authentication timestamp of the remote device and a command transmission timestamp of the remote device, wherein the authentication timestamp and the command transmission timestamp are received with the first command.

These and other aspects, features, and benefits of the claimed embodiments will become apparent from the following detailed written description of embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
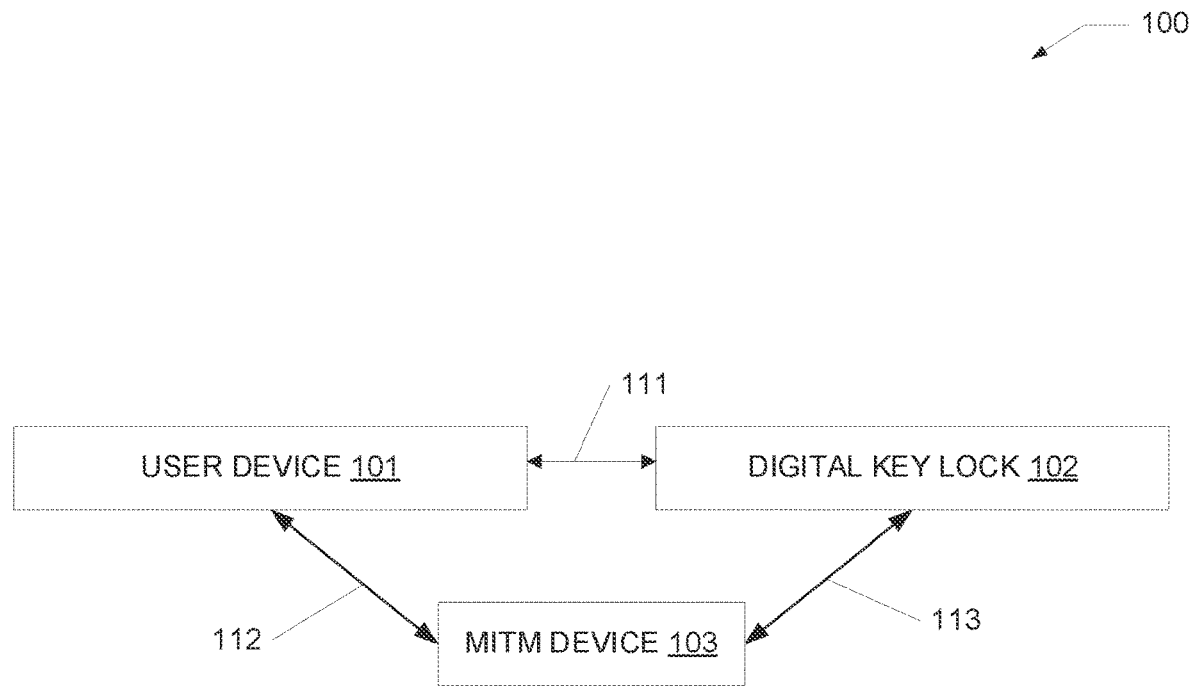
FIG. 1 illustrates a system for unlocking a digital key lock, according to one embodiment of the present disclosure.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems and methods for mitigating delayed message attacks. In one or more embodiments, a delayed-message attack is defined as a technique for gaining unauthorized access to secure environments. In some embodiments, a delayed-message attack functions by positioning a man-in-the-middle (MITM) device between two authorized devices. The first authorized device may be a device that requests access to the secure environment. The second authorized device may be a device that grants access to the secure environment based on the initial request made by the first authorized device. For example, the first authorized device may be a mobile device used for unlocking a car. Continuing this example, the second authorized device may be an unlocking/locking mechanism of the car.

In various embodiments, the MITM device intercepts and withholds an encrypted unlocking command made by the first authorized device from the second authorized device. In one or more embodiments, the MITM device withholds several encrypted unlocking commands made by the first authorized device. A user of the first authorized device may give up on unlocking the secure environment and walk away from its vicinity. A user of the MITM device may release the encrypted unlock command sent by the first authorized device. In at least one embodiment, the second authorized device receives the released encrypted unlock command and unlocks the secure environment. In multiple embodiments, the user of the MITM device gains unauthorized access to the secure environment while the user of the first authorized device is away from the vicinity of the secure environment.

In one or more embodiments, the disclosed techniques mitigate delayed-message attacks on secure environment systems. In various embodiments, a first authorized device and a second authorized device authenticate a communication at specific points in time. In some embodiments, the first authorized device and the second authorized device save authentication timestamps associated with when the communication is authenticated. Once the communication between the two devices is authenticated, the first authorized device may send an encrypted command to the second authorized device. In various embodiments, the first authorized device records and saves a first timestamp indicating when the first authorized device sends the encrypted command, and the second authorized device records and saves a second timestamp indicating when the second authorized device receives the encrypted command.

In one or more embodiments, the first authorized device embeds the timestamps into the encrypted command sent to the second authorized device. In particular embodiments, the second authorized device can calculate, based on the timestamps received from the first authorized device and its own recorded timestamps, if the encrypted command is intentionally delayed. In some embodiments, if the encrypted command is delayed, the second authorized device will deny access to the secure environment or ignore the command received from the first authorized device. In other embodiments, if the encrypted command is not delayed, the second authorized device will grant access to the secure environment or execute the command received from the first authorized device.

EXEMPLARY EMBODIMENTS

Referring now to the figures, for the purposes of example and explanation of the fundamental processes and components of the disclosed systems and processes, reference is made to FIG. 1, which illustrates an exemplary system 100 for unlocking a digital key lock. As will be understood and appreciated, the exemplary, system 100 shown in FIG. 1 represents merely one approach or embodiment of the present concept, and other aspects are used according to various embodiments of the present concept. In some embodiments, the system 100 includes a man-in-the-middle (MITM) device 103 that is used to gain unauthorized access to a particular system. In various embodiments, the MITM 103 attempts to gain unauthorized access to a particular system or location through a wireless transport connection 111 between two or more authenticated devices. The wireless transport connection 111 may include, but is not limited to, Bluetooth Low Energy (BLE), Ultra Wide Band (UWB), Wi-Fi Communications, or any other wireless communications.

In various embodiments, a delayed-message attack may occur between a user device 101 and a digital key lock 102 through the man-in-the-middle (MITM) device 103. In at least one embodiment, the user device 101 includes any form of wirelessly communicating system that can establish a communication between devices and produce encrypted keys for authorized access to particular environments. Examples of user devices 101 may include but are not limited to wireless communicating car keys, cellular devices, smart watches, and other Internet of Things (IoT) devices.

In multiple embodiments, the digital key lock 102 is a device that authenticates encrypted communications sent by the user device 101. In some embodiments, the digital key lock 102 performs particular actions based on the encrypted data received by the user device 101. Examples of digital key locks 102 may include but are not limited to car locking mechanisms, home locking mechanisms, wireless locking systems, computer systems, server systems, and any other wireless securing system. The digital key lock 102 may be an example of an operation device that performs a specific operation based on a request from another device, such as the user device 101. As used herein, the digital key lock 102 may be replaced by other operation devices. For example, the other operation devices may perform any other operations in secured environments other than locking or unlocking components. The other operations may include performing specific tasks as instructed by the user device 101.

In some embodiments, the MITM device 103 is a wireless device that delays messages between two wirelessly communicating components. The MITM device 103 may function under the same communication protocols as the user device 101 and the digital key lock 102. For example, the MITM device 103 is able to record, measure, and listen into the BLE communication conducted between the user device 101 and the digital key lock 102. In at least one embodiment, the MITM device 103 is capable of delaying messages between the user device 101 and the digital key lock 102. For example, the MITM device 103 may intercept an encrypted message 112 and send a delayed encrypted message 113 at a later time.

For the purpose of this explanation, the digital key lock 102 may correspond to the locking/unlocking mechanism of a car, while the user device 101 may correspond to a mobile device used to unlock the car. Although specifically described in the context of automobile security mechanisms, the techniques described herein may be applied to other secured environments. In a typical use case scenario, the delayed-message attack may begin with an actor placing the MITM device 103 within wireless communication range of the digital key lock 102 of the particular car. An actor may be defined as an individual attempting to gain unauthorized access to a particular environment, in this scenario the car. In some embodiments, once the MITM device 103 is in place, the actor waits for the user to approach and unlock their car.

When a user approaches the car and initiates an unlock command, the user device 101 and the digital key lock 102 may establish the wireless transport connection 111. In particular embodiments, the user device 101 and the digital key lock 102 authenticate their communication through the wireless transport connection 111. In some embodiments, the user device 101 and the digital key lock 102 employ any key agreement protocol to establish session encryption keys. Key agreement protocols may include, but are not limited to, Transport Layer Security (SSL), Secure Sockets Layers (SSL), Diffie-Hellman key exchange (Pure DH), RSA public-key cryptosystem, DHE, Elliptic-Curve Diffie-Hellman key exchange (ECDH), Pre-Shared Key (PSK), Secure Remote Password protocol (SRP), Elliptic-Curve Diffie-Hellman key exchange (ECDHE), and Noise protocol.

In one or more embodiments, once the communication has been authenticated, the user device 101 sends the encrypted message 112 to the digital key lock 102. For example, an encrypted message 112 can be an encrypted unlock signal from the mobile device to the car unlock mechanism. In a non-attack scenario, the encrypted message 112 may reach the digital key lock 102, the digital key lock 102 may authenticate the encrypted message 112, and the car may unlock if the credentials are approved. In multiple embodiments, during the delayed-message attack, the MITM 103 device intercepts the encrypted message 112, and withholds the encrypted message 112 from the digital key lock 102. This may keep the car from unlocking. In some embodiments, when the delay period is long enough, the user leaves the car after one or more failed unlock attempts, allowing the actor to release the delayed encrypted message 113. In various embodiments, by releasing the delayed encrypted message 113, the signal reaches the digital key lock 102 and unlocks the car while the user is away, allowing the actor access to the vehicle.

Figure 2:
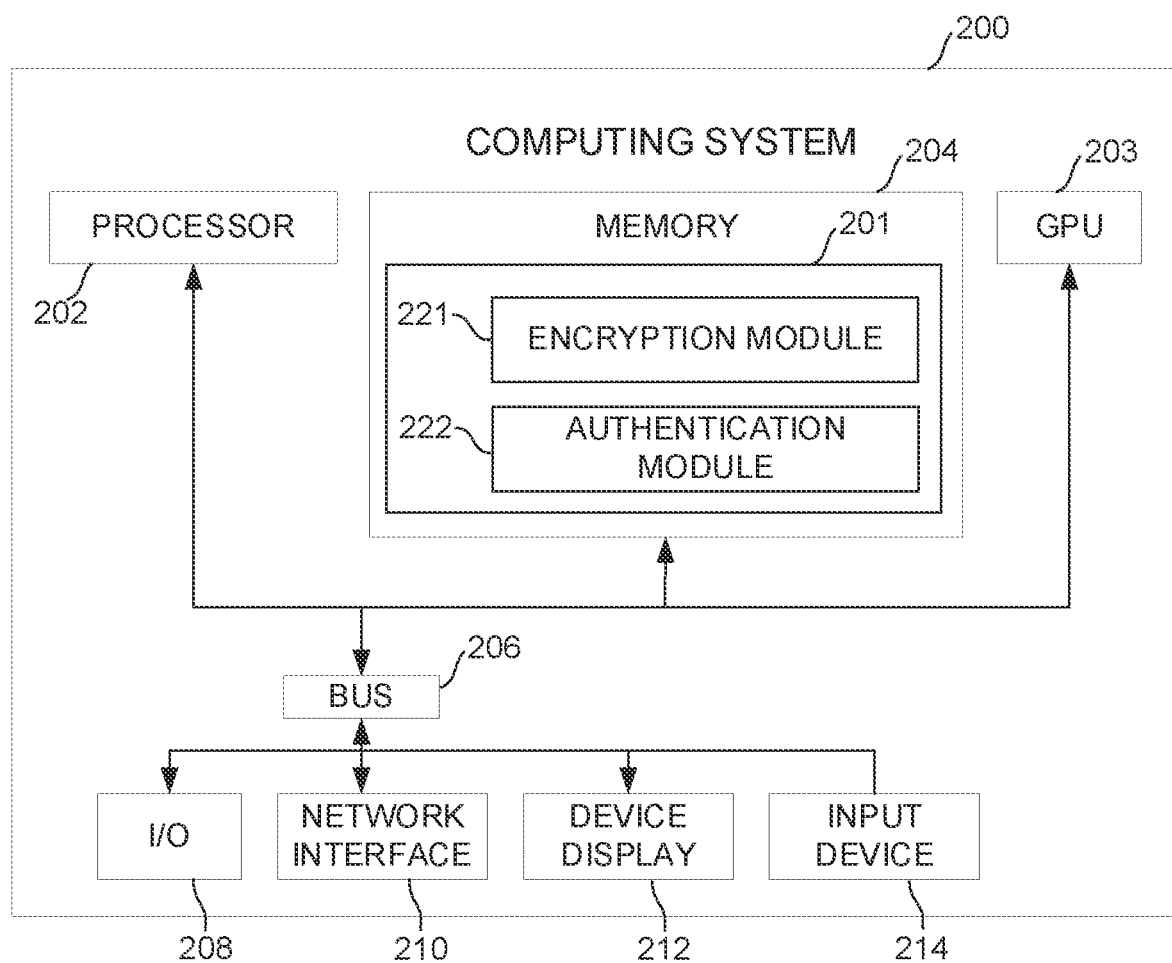
FIG. 2 illustrates an exemplary computing system, according to one embodiment of the present disclosure.

Any suitable computing system or group of computing systems may be used for performing the operations described herein. For example, FIG. 2 depicts an example of a computing system 200 that may be implemented as the user device 101 or the digital key lock 102. In some embodiments, the computing system 200 includes a processor 202 that executes an encryption application 201, a memory 204 that stores various data computed or used by the encryption application 201, an input device 214 (e.g., a mouse, a stylus, a touchpad, a touchscreen, etc.), and a display device 212 that displays graphical content generated by the encryption application 201. In at least one embodiment, for illustrative purposes, FIG. 2 depicts a single computing system on which the encryption application 201 is executed, and the input device 214 and display device 212 are present. But these applications, datasets, and devices may be stored or included across different computing systems having devices similar to the devices depicted in FIG. 2.

In one or more embodiments, the encryption application 201 includes an encryption module 221 and an authentication module 222. The encryption module 221 may encrypt or decrypt any particular information received through the wireless transport communications 111 of the computing system 200. The authentication module 222 may perform any authentication procedures necessary to mitigate delayed-message attacks and other unauthorized access attempts to the computing system 200. In various embodiments, the technique employed by the authentication module 222 to mitigate delayed-message attacks are described in further detail in FIG. 3 and its corresponding description.

In one or more embodiments, the depicted example of a computing system 200 includes the processor 202 communicatively coupled to one or more memory devices 204. In some embodiments, the processor 202 executes computer-executable program code stored in a memory device 204, accesses information stored in the memory device 204, or both. Examples of the processor 202 may include a microprocessor, an application-specific integrated circuit ("ASIC"), a field-programmable gate array ("FPGA"), or any other suitable processing device. The processor 202 may include any number of processing devices, including a single processing device. In an example, the computing system 200 includes a graphics processing unit (GPU) 203. In another example, the processor 202 may be configured to perform the functions of the GPU 203 described herein (e.g., by causing the processor 202 to execute specialized graphics processing software).

In various embodiments, the memory device 204 includes any suitable non-transitory computer-readable medium for storing data, program code, or both. A computer-readable medium may include any electronic, optical, magnetic, or other storage device capable of providing a processor with computer-readable instructions or other program code. Non-limiting examples of a computer-readable medium may include a magnetic disk, a memory chip, a ROM, a RAM, an ASIC, optical storage, magnetic tape or other magnetic storage, or any other medium from which a processing device may read instructions. The instructions may include processor-specific instructions generated by a compiler or an interpreter from code written in any suitable computer-programming language, including, for example, C, C++, C#, Visual Basic, Java, Python, Perl, JavaScript, Clojure, ClojureScript, and ActionScript.

The computing system 200 may also include a number of external or internal devices, such as the input device 214, the display device 212, or other input or output devices. For example, the computing system 200 is shown with one or more input/output ("I/O") interfaces 208. An I/O interface 208 may receive input from input devices or provide output to output devices. In particular embodiments, one or more buses 206 are also included in the computing system 200. In an example, the buses 206 communicatively couple one or more components of the computing system 200.

In some embodiments, the computing system 200 executes program code that configures the processor 202 to perform one or more of the operations described herein. The program code may include, for example, the encryption application 201 or other suitable applications that perform one or more operations described herein. The program code may be resident in the memory device 204 or any suitable computer-readable medium and may be executed by the processor 202 or any other suitable processor. In at least one embodiment, all modules in the encryption application 201 (e.g., the encryption module 221, the authentication module 222, etc.) are stored in the memory device 204, as depicted in FIG. 2. In additional or alternative embodiments, one or more of these modules from the encryption application 201 are stored in different memory devices of different computing systems.

In some embodiments, the computing system 200 also includes a network interface device 210. The network interface device 210 may include any device or group of devices suitable for establishing a wired or wireless data connection to one or more data networks. Non-limiting examples of the network interface device 210 include an Ethernet network adapter, a modem, and/or a wireless communication antenna. In various embodiments, the computing system 200 is able to communicate with one or more other computing devices (e.g., a computing device that receives inputs for encryption application 201 or displays outputs of the encryption application 201) via a data network using a network interface device. In at least one or more embodiments, the computing system 200 can establish a wireless communication using the network interface device 210 through the wireless transport connection 111.

An input device 214 may include any device or group of devices suitable for receiving visual, tactile, auditory, wireless or other suitable input that controls or affects the operations of the processor 202. Non-limiting examples of the input device 214 may include a touchscreen, stylus, a mouse, a keyboard, a microphone, a separate mobile computing device, etc. A display device 212 may include any device or group of devices suitable for providing visual, auditory, or other suitable sensory output. Non-limiting examples of the display device 212 include a touchscreen, a monitor, a separate mobile computing device, etc.

Although FIG. 2 depicts the input device 214 and the display device 212 as being local to the computing device that executes the encryption application 201, other implementations may be possible. For instance, in some embodiments, one or more of the input device 214 and the display device 212 include a remote client-computing device that communicates with the computing system 200 via the network interface device 210 using one or more data networks described herein.

Figure 3:
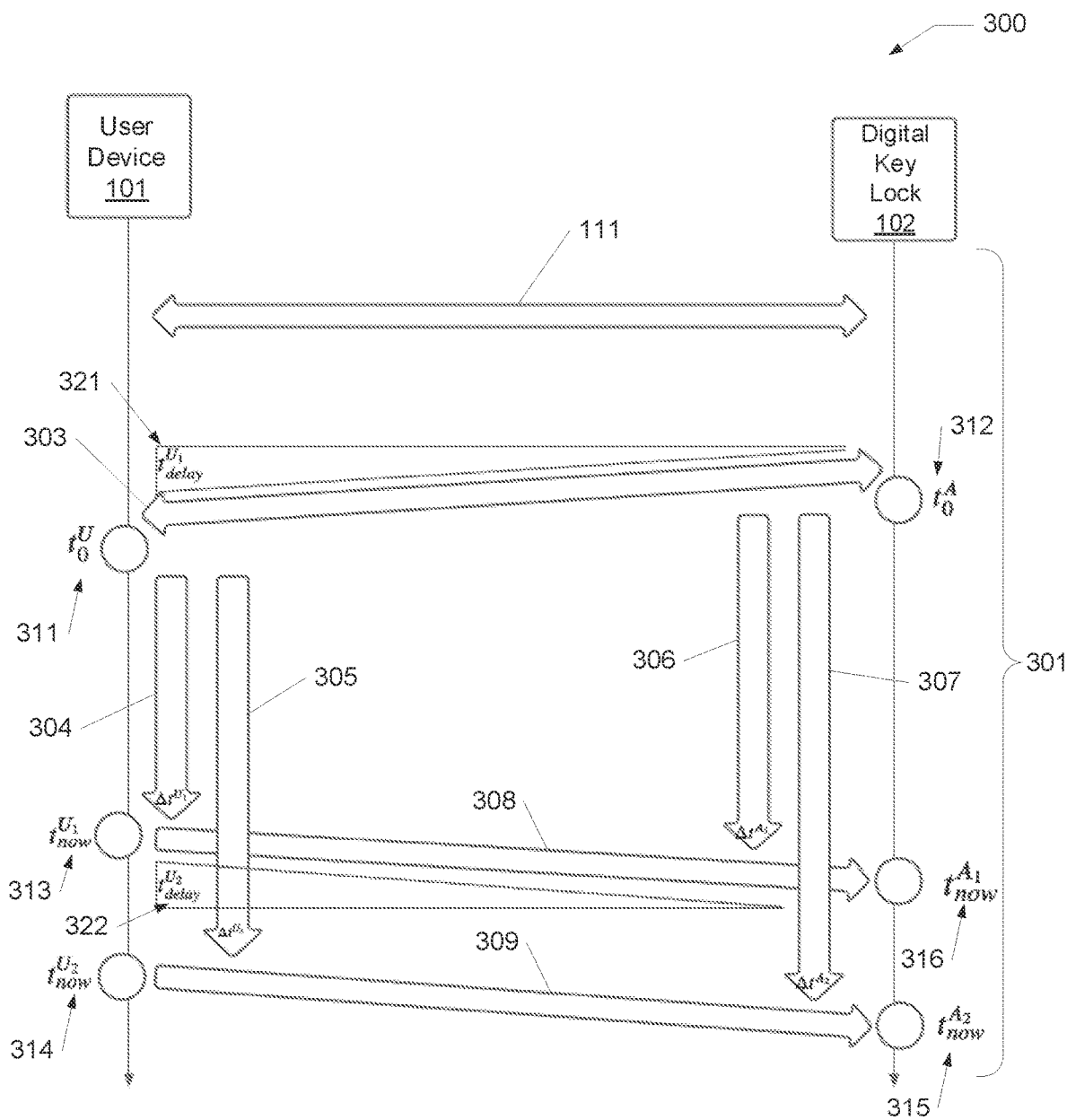
FIG. 3 illustrates an exemplary delayed-message attack mitigation technique, according to one embodiment of the present disclosure.

Referring now to FIG. 3, illustrated is an exemplary delayed-message attack mitigation technique 300, according to one embodiment of the present disclosure. In one or more embodiments, the delayed-message attack mitigation technique 300 is performed by the user device 101 and the digital key lock 102. In particular embodiments, the delayed-message attack mitigation technique 300 integrates with any transport protocol and key agreement and encryption protocol. In one or more embodiments, the delayed-message attack mitigation technique 300 is executable even if both the user device 101 and digital key lock 102 have asynchronous clocks. For example, the user device 101 may include a clock that counts time asynchronously with respect to the clock of the digital key lock 102. In particular embodiments, the delayed-message attack mitigation technique 300 calculates time differences 304 and 306 independently for each device (e.g., user device 101, digital key lock 102).

In various embodiments, the delayed-message attack mitigation technique 300 can include estimated time delays. Estimated time delays can correspond to estimated values for an authentication delay 321 and an encryption delay 322. The digital key lock 102 and/or the user device 101 can include pre-programmed estimated values for the authentication delay 321 and the encryption delay 322. The estimated time delays for the authentication delay 321 and the encryption delay 322 can represent the estimated time it will take for an authentication signal and encryption signal to travel between the digital key lock 102 and the user device 101, respectively. The estimated time delays for the authentication delay 321 and the encryption delay 322 can incorporate transmission delays. The transmission delay can be a value that corresponds to the time it takes for a message to travel through a particular medium. The transmission delay can be affected by the medium the signal is traveling through and the protocol used for the communication. For example, a message traveling through air may have a shorter transmission delay compared to a message traveling through water. In some embodiments, other example variables that affect the transmission delay are, but are not limited to, overhead of sending the command over a connection, distance between the key lock 102 and the user device 101, encrypted message 308 processing times by the user device 101 and/or the digital key lock 102, marking timestamps, and executing and/or encrypting the encrypted message 308 and/or any other message.

The transmission delay can be an estimated value. For example, the digital key lock 102 and/or the user device 101 can generate the estimated time delays. The digital key lock 102 and/or the user device 101 can generate the estimated time delay by using statistical algorithms, machine learning, known conditions, or any other particular method. For example, the digital key lock 102 and/or the user device 101 can gather historical data of known transmission delays based on the location of the devices, the medium the devices are communicating through, and the protocol being used for the communications. The digital key lock 102 and/or the user device 101 can run statistical regressions and/or any other particular algorithm against the gathered historical data to estimate future authentication delays 321 and encryption delays 322. A MaxDelay value can incorporate the estimated time delays for further processing. The MaxDelay value can be used by the user device 101 and/or the digital key lock 102 to determine if a delayed message attack has been conducted. In some embodiments, MaxDelay will be discussed in further detail herein.

The estimated time delays can facilitate asynchronous implementation of the delayed-message attack mitigation technique 300. The delayed-message attack mitigation technique 300 can be conducted while both the user device 101 and the digital key lock 102 have unsynchronized clocks. For example, the user device 101 can count at a different time interval compared to the digital key lock 102. The user device 101 and/or the digital key lock 102 can perform the delayed-message attack mitigation technique 300 by calculating differences in communication and processing time. By calculating differences in communication and processing time for each device (e.g., user device 101, digital key lock 102), the devices performing the delayed-message attack mitigation technique 300 do not require synchronized communications. The delayed-message attack mitigation technique 300 can determine if an attack is being performed by recognizing if the calculated differences in communication and processing time of the user device 101 or any other device communicating a command is within an expected predetermined range. In some embodiments, the user device 101 and the digital key lock 102 do not require synchronized communications for determining the time differences during communication.

In some embodiments, the diagram present in FIG. 3 illustrates the communication between the user device 101 and the digital key lock 102 with respect to time. In particular embodiments, time is shown using a continuous time scale 301. In at least one or more embodiments, the continuous time scale 301 represents the total communication time between two or more devices. Various timestamps 311, 312, 313, 314, 315, and 316 may specify exact points in time on the continuous time scale 301. For example, the second authentication timestamp 311 has a definite location on the continuous time scale 301 and is denoted by the variable $t_o^U$. The remaining timestamps will be discussed in further detail herein. In some embodiments, timestamps further away from the source (e.g., user device 101 and digital key lock 102) occurred later in time than timestamps closer to the source shown in FIG. 3.

In some embodiments, the delayed-message attack mitigation technique 300 begins with a communication between the user device 101 and the digital key lock 102. The user device 101 and the digital key lock 102 may establish the wireless transport communication 111 to begin sending and receiving information. As discussed herein, the wireless transport communication 111 may include BLE, UWB, Wi-Fi, or any other suitable wireless communication protocol.

In various embodiments, once the wireless transport communication 111 is established, the user device 101 and the digital key lock 102 establish an authentication connection 303. In one or more embodiments, the authentication connection 303 is a communication between the user device 101 and the digital key lock 102 that determines the key agreement protocol for establishing session encryption keys. In particular embodiments, the authentication connection 303 is bidirectional and is initiated by the digital key lock 102 or the user device 101. In some embodiments, the authentication connection 303 begins at a point in time indicated by the first authentication timestamp 312. In multiple embodiments, the first authentication timestamp 312 is denoted by the variable $t_o^A$. In various embodiments, the user device 101 receives the authentication connection 303 at the second authentication timestamp 311. In some embodiments, the difference in time for the authentication connection 303 to leave the digital key lock 102 and arrive at the user device 101 is referred to as the authentication delay 321. In various embodiments, the authentication delay 321 is denoted by the variable $t_{delay}^{U_1}$. In particular embodiments, the first authentication timestamp 312 takes place sometime before the second authentication timestamp 311 to reduce the likelihood of false positives when the variable MaxDelay is set too high. For example, when using the TLS protocol, the clocks of the user device 101 and the digital key lock 102 may be set to an initial value once completing a handshake between the two devices.

In one or more embodiments, once an authentication connection 303 has been established between the user device 101 and the digital key lock 102, encrypted messages 308 and 309 can be sent between the two devices during the same encryption session (e.g., using the same session key for encryption). In particular embodiments, the encrypted message 308 represents a first unlock signal sent by the user device 101 to the digital key lock 102. In some embodiments, the encrypted message 308 is sent by the user device 101 at a time indicated by the first sent encryption timestamp 313. The first sent encryption timestamp 313 may be denoted by the variable $t_{now}^{U_1}$. In at least one embodiment, the encrypted message 308 is received by the digital key lock 102 at a time indicated by the first received encryption timestamp 316. The first received encryption timestamp 316 may be denoted by the variable $t_{now}^{A_1}$. In various embodiments, the travel time for the encrypted message 308 is measured by the encryption delay 322, denoted by the variable $t_{delay}^{U_2}$.

In multiple embodiments, the encrypted message 308 contains data, which includes an unlock command and values for the second authentication timestamp 311 and the first sent encryption timestamp 313. In one or more embodiments, the encrypted message 308 is encrypted with a session key. Once the digital key lock 102 receives the encrypted message 308, the encryption module 221 of the digital key lock 102 may decrypt the encrypted message 308 and extract its contents.

In various embodiments, the authentication module 222 of the digital key lock 102 can begin performing calculations to verify and authenticate the communication form the user device 101. In at least one embodiment, the authentication module 222 receives the second authentication timestamp 311 and the first sent encryption timestamp 313. The authentication module 222 may calculate a user device time difference 304 and a digital lock key time difference 306. In various embodiments, the user device time difference 304 is defined by the variable $\Delta t^{U_1}$ and can be calculated with the following Equation 1:

$$\Delta t^{U_1} = t_{now}^{U_1} - t_o^U \qquad \text{(Equation 1)}$$

In particular embodiments, the digital key lock time difference 306 is defined by the variable $\Delta t^{A_1}$ and can be calculated with the following Equation 2:

$$\Delta t^{A_1} = t_{now}^{A_1} - t_o^A \qquad \text{(Equation 2)}$$

In some embodiments, once the authentication module 222 of the digital key lock 102 calculates the user device time difference 304 and the digital key lock time difference 306, the authentication module 222 uses these two values to assess the following Equation 3:

$$\Delta t^{A_1} \leq \Delta t^{U_1} + \text{MaxDelay} \qquad \text{(Equation 3)}$$

Equation 3 may be employed to determine if an encrypted message 308 has been delayed or not. For example, if the digital key lock time difference 306 is less than or equal to the sum of the MaxDelay and the user device time difference 304, then the encrypted message 308 has not been delayed. In an alternative example, if the digital key lock time difference 306 is greater than the sum of the MaxDelay and the user device time difference 304, then the encrypted message has been delayed. In various embodiments, MaxDelay is a calculated or estimated value of the following Equation 4:

$$\text{MaxDelay} = t_{delay}^{U_2} + t_{delay}^{U_1} \qquad \text{(Equation 4)}$$

In one or more embodiments, the value MaxDelay is calculated using the timestamps 311, 312, 313, and 316. Calculating the MaxDelay may also be performed using timestamps 314 and 315 instead of timestamps 313 and 316, respectively. In at least one embodiments, the value MaxDelay is estimated and predefined. In one or more embodiments, the authentication module 222 updates MaxDelay after evaluating the authenticity of the encrypted messages 308 and 309. When estimated, the digital key lock 102 may employ machine-learning algorithms to estimate the authentication delay 321 and the encryption delay 322. Statistical techniques may also be used to aggregate historical delay data to estimate the value of MaxDelay. In some embodiments, MaxDelay is parameterizable and should derive its parameters (e.g., authentication delay 321 and encryption delay 322) from connections, such as maximum transmission unit (MTU) and received signal strength indicator (RSSI). In at least one embodiments, to mitigate false negative responses from the digital key lock 102, the MaxDelay value is set to a large enough value to accommodate for slow connection transport of authentication connections 303 and encrypted messages 308 and 309. In various embodiments, the max delay value is not set high enough for the actor using the MITM device 103 to access the particular environment. In certain embodiments, the value for MaxDelay is calculated and/or estimated for each particular established connection. For example, the computing system 200 may predict the value of MaxDelay using machine learning algorithms. Continuing this example, the computing system 200 can adjust the value of MaxDelay based on historical data, analyzing live communication feeds, or a combination thereof. In at least one embodiment, the computing device takes into account the physical layer properties of the communication medium and the particular environment to determine an appropriate value for MaxDelay.

For a second encryption message 309, the process described herein may be repeated with differing timestamps. In various embodiments, the encryption message 309 includes a second sent encryption timestamp 314, a second received encryption timestamp 315, a second user device time difference 305, and a second digital key lock time difference 307. In particular embodiments, the second encryption message 309 is provided to demonstrate that the delayed-message attack mitigation technique 300 is applicable to varying parameters (e.g., varying time differences and timestamps).

In one or more embodiments, the authentication module 222 applies the delayed-message attack mitigation technique 300 to the second encrypted message 309. In particular embodiments, the user device 101 sends the second encrypted message 309 containing the unlock command, the second authentication timestamp 311 value, and the second sent encryption timestamp 314. The second sent encryption timestamp 314 may be denoted by the variable $t_{now}^{U_2}$. In particular embodiments, the authentication module 222 calculates the second user device time difference 305 by using Equation 5:

$$\Delta t^{U_2} = t_{now}^{U_2} - t_o^{U} \quad \text{(Equation 5)}$$

In one or more embodiments, the second user device time difference 305 is denoted by the variable $\Delta t^{U_2}$. In various embodiments, the authentication module 222 of the digital key lock 102 calculates the second digital key lock time difference 307. The second digital key lock time difference 307 may be denoted by the variable $\Delta t^{A_2}$ and may be calculated by using Equation 6:

$$\Delta t^{A_2} = t_{now}^{A_2} - t_o^{A} \quad \text{(Equation 6)}$$

In at least one embodiment, the Equation 6 includes the second received encryption timestamp 315, which is denoted by the variable $t_{now}^{A_2}$. In some embodiments, the authentication module 222 uses the second user device time difference 305 and the second digital key lock time difference 307 to calculate Equation 7:

$$\Delta t^{A_2} \leq \Delta t^{U_2} + \text{MaxDelay} \quad \text{(Equation 7)}$$

In particular embodiments, the MaxDelay variable is substantially similar to the value calculated in Equation 4. In various embodiment, the encryption delay 322 is recalculated or estimated for the second encryption message 309. The authentication module 222 can use Equation 7 to grant or deny access to the secure environment. For example, if the second digital key lock time difference 307 is less than or equal to the sum of the MaxDelay value and the second user device time difference 305, the authentication module 222 of the digital key lock 102 will grant access to the secure environment. Continuing this example, if the second digital key lock time difference 307 is greater than the sum of the MaxDelay value and the second user device time difference 305, the authentication module 222 of the digital key lock 102 will deny access to the secure environment.

Four exemplary delayed-message attack mitigation techniques will be discussed herein. In these examples, values are presented to demonstrate specific examples of the delayed-message attack mitigation technique. It should be understood that any particular values may be input into the delayed message attack mitigation technique to elicit a particular response and the following examples are intended to be illustrative, but non-limiting. For the following examples, time is recorded in a military time configuration, although one of ordinary skill in the art will recognize that any particular time configuration may be use. For example, the time 15:10:13.750 is equivalent to the 15th hour of a particular day (3 PM), the 10th minute of that hour, and the 13.75th second of that minute.

In a first example, the MaxDelay value is set to 2 seconds. Continuing with this example, the user device 101 may attempt to access the digital key lock 102 and the first authentication timestamp 312 is recorded at a time of 13:24:56.500, and the second authentication timestamp 311 is recorded at a time of 13:24:56.900. Continuing with this first example, the system records the first sent encryption timestamp 313 at a time of 13:24:59.100, and the system records the first received encryption timestamp 316 at a time of 13:24:59.400. In this example, the system, using the timestamps 311, 312, 313, and 316 and equations 1 and 2, may calculate a value for the user device time difference 304 of 2.2 seconds, and calculate a digital key lock time difference 306 of 2.9 seconds. Using equation 3, in this first example, the system may approve the unlock request and unlock the digital key lock 102. Continuing with this first example, the system records the second sent encryption timestamp 314 at a time of 13:25:03.100 and the second received encryption timestamp 315 at a time of 13:25:03.600. Using the timestamps 311, 312, 314, and 315 and equations 5 and 6, the system calculates a value for the second user device time difference 305 of 6.2 seconds, and the second digital key lock time difference 307 of 7.1 seconds. Applying the time differences 305 and 307 to the inequality in equation 7, the system may approve the unlock request and the system may unlock the digital key lock 102.

In a second example, the MaxDelay value is set to 2 seconds. Continuing with this example, the MITM device 103 may attempt a delayed message attack on the user device 101 and the digital key lock 102. Continuing with the second example, the system records the first authentication timestamp 312 at a time of 13:24:56.500 and the second authentication timestamp 311 at a time of 13:24:56.900. Continuing with this example, the system records the first sent encryption timestamp 313 at a time of 13:24:59.100 and the first received encryption timestamp 316 at a time of 13:25:02.400. In this example, the system, using the timestamps 311, 312, 313, and 316 and equations 1 and 2, may calculate a value for the user device time difference 304 of 2.2 seconds, and may calculate a value for the digital key lock time difference 306 of 5.9 seconds. Using equation 3, the system may deny the unlock request and the digital key lock 102 may stay locked. Continuing with this second example, the system records the second sent encryption timestamp 314 at a time of 13:25:03.100 and the second received encryption timestamp 315 at a time of 13:28:03.600. In the second example, using the timestamps 311, 312, 314, and 315 and equations 5 and 6, the system may calculate a value for the second user device time difference 305 of 6.2 seconds, and may calculate a value for the second digital key lock time difference 307 of 10.1 seconds. In this example, the system applies the time differences 305 and 307 to the inequality in equation 7, and may deny the unlock request and the digital key lock 102 may stay locked. Continuing this example, the digital key lock 102 may stay locked after the system detects a delayed message attack from the MITM device 103.

In a third example, the MaxDelay value is set to 10 seconds. Continuing this example, setting the MaxDelay value too high may cause the delayed-message attack mitigation technique 300 of the system to produce false negative events. In at least one embodiment, a false negative occurs when the MITM device 103 unlocks the digital key lock 102 by evading the delayed-message attack mitigation technique 300. Continuing the third example, the system records the first authentication timestamp 312 at a time of 13:24:56.500 and the second authentication timestamp 311 at a time of 13:24:56.900. Continuing this example, the system records the first sent encryption timestamp 313 at a time of 13:24:59.100 and the first received encryption timestamp 316 at a time of 13:25:02.400. Continuing the third example, the system, using the timestamps 311, 312, 313, and 316 and equations 1 and 2, may calculate a value for the user device time difference 304 of 2.2 seconds, and may calculate a value for the digital key lock time difference 306 of 5.9 seconds. In this example, using equation 3, the system may approve the unlock request and the digital key lock 102 may unlock. In the third example, the digital key lock 102 unlocks although the request was performed by the MITM device 103. Continuing the third example, the system records the second sent encryption timestamp 314 at a time of 13:25:03.100 and the second received encryption timestamp 315 at a time of 13:28:03.600. Continuing this example, the system, using the timestamps 311, 312, 314, and 315 and equations 5 and 6, may calculate the value for the second user device time difference 305 of 6.2 seconds, and may calculate the value of the second digital key lock time difference 307 of 10.1 seconds. Applying the time differences 305 and 307 to the inequality in equation 7, the system may approve the unlock request and the digital key lock 102 may unlock. In this example, the unlock was performed by the MITM device 103.

In a fourth example, the MaxDelay value is set to 0.1 seconds. In this example, the MaxDelay value is too low, which causes the delayed-message attack mitigation technique 300 of the system to produce false positive events. In certain embodiments, a fall positive event occurs when the user device 101 sends an unlock request to the digital key lock 102, but the system does not approve the request even without the presence of the MITM device 103. Continuing with the fourth example, the system records the first authentication timestamp 312 at a time of 13:24:56.500 and the second authentication timestamp 311 at a time of 13:24:56.900. In this same example, the system records the first sent encryption timestamp 313 at a time of 13:24:59.100 and the first received encryption timestamp 316 at a time of 13:24:59.400. Continuing this example, the system, using the timestamps 311, 312, 313, and 316 and equations 1 and 2, may calculate the value for the user device time difference 304 of 2.2 seconds and the digital key lock time difference 306 of 2.9 seconds. Using equation 3, the system may deny the unlock request and the digital key lock 102 may stay locked. In certain embodiments, the system records the second sent encryption timestamp 314 at a time of 13:25:03.100 and the second received encryption timestamp 315 at a time of 13:25:03.600. In this example, Using the timestamps 311, 312, 314, and 315 and equations 5 and 6, the system may calculate a value for the second user device time difference 305 of 6.2 seconds and a value for the second digital key lock time difference 307 of 7.1 seconds. Applying the time differences 305 and 307 to the inequality in equation 7, the system may deny the unlock request and the digital key lock 102 may stay locked. In this example, the user device 101 attempted an authorized access to the digital key lock 102, but was denied access.

Figure 4:
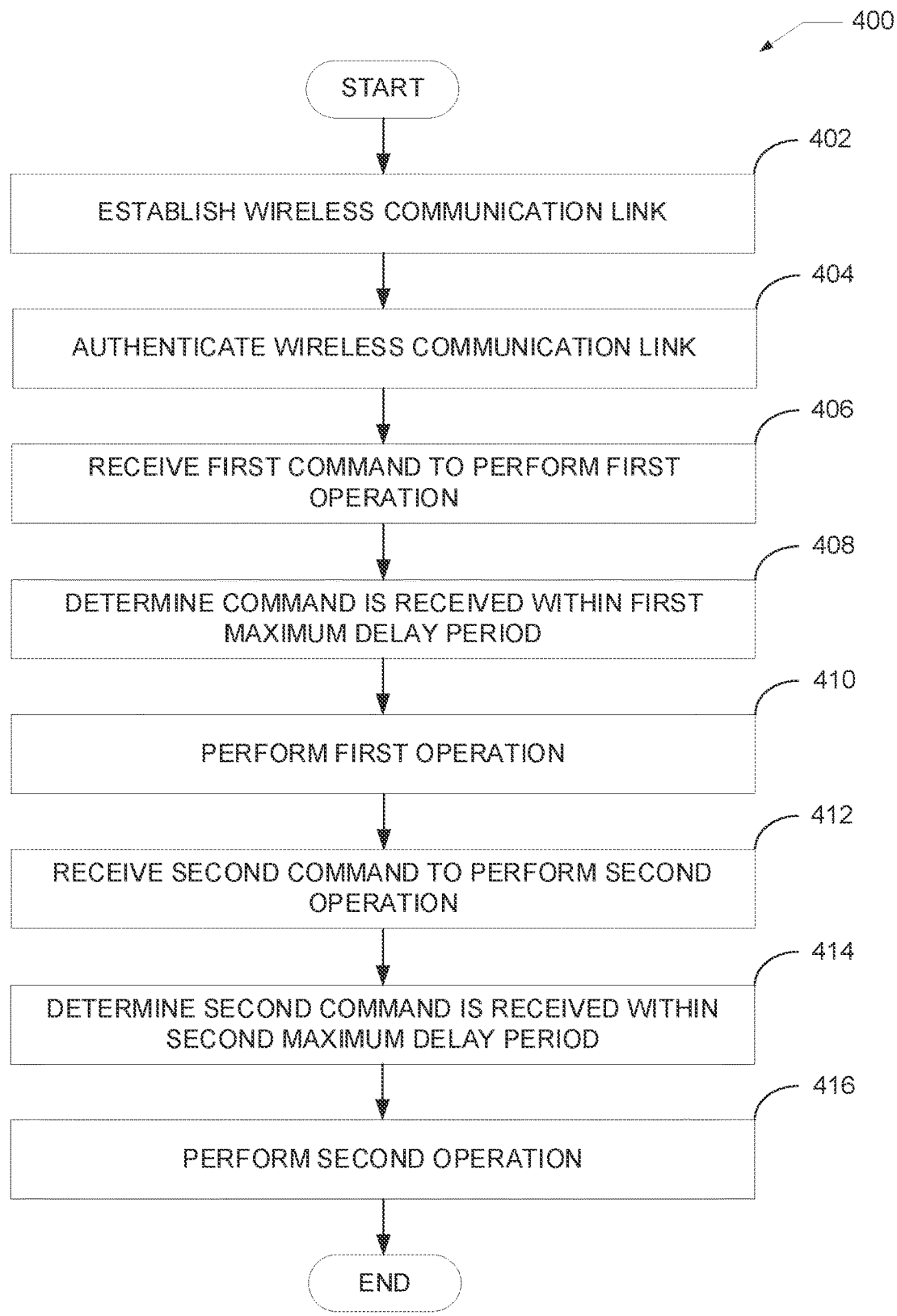
FIG. 4 illustrates a flowchart of a process for authenticating a communication, according to one embodiment of the present disclosure.

Referring now to FIG. 4, illustrated is a flowchart of a process 400 for authenticating a communication, according to one embodiment of the present disclosure. In various embodiments, the process 400 corresponds to the exemplary delayed-message attack mitigation technique 300 discussed in FIG. 3.

At box 402, the process 400 includes establishing a wireless communication link between a user device and a digital key lock device, such as the user device 101 and the digital key lock 102 described above with respect to FIGS. 1 and 3. In some embodiments, establishing the wireless communication link may generate the wireless transport connection 111 described above with respect to FIG. 1. The wireless communication link may be established using any appropriate transport protocol, such as BLE, UWB, and Wi-Fi.

At box 404, the process 400 includes authenticating the wireless communication link. Authenticating the wireless communication may take place at the authentication connection 303 of FIG. 3. In some embodiments, the authentication connection 303 launches the key agreement protocol, which establishes the session encryptions keys used for encrypting and decrypting messages between the user device 101 and the digital key lock 102. In various embodiments, the key agreement protocols can include, but are not limited to, TLS, pure DH, SSL, and Noise protocol.

At box 406, the process 400 includes receiving a first command to perform a first operation. In some embodiments, the digital key lock 102 receives a first command from the user device 101 through the encrypted message 308. In at least one embodiment, the encryption module 221 of the digital key lock 102 decrypts the encrypted message 308 and extracts the first command. In one or more embodiments, the first command includes a request to unlock a car along with timestamp information processed by the user device 101. In an additional embodiment, the first command may include any other commands that are relevant to the functionality of the digital key lock 102.

At box 408, the process 400 includes determining if the first command is received within the first maximum delay period, according to one embodiment of the present disclosure. The authentication module 222 of the digital key lock 102 may receive the first command and the timestamps sent by the user device 102 from the encryption module 221. In one or more embodiments, the authentication module 222 obtains timestamps produced by the digital key lock 102. In some embodiments, the authentication module 222 uses the timestamps produced by the user device 101 and the digital key lock 102 to calculate the time differences of the user device 101 and the digital key lock 102. For example, the digital key lock may use Equation 1 and Equation 2 to calculate the time differences for the encrypted message 308. In various embodiments, the authentication module 222 compares the time difference values, with an added delay estimate, to determine if the first command is valid, such as by using Equation 3 discussed above with respect to FIG. 3. In the case where the first command is valid (e.g., the message has not been delayed), the authentication module 222 of the digital key lock 102 may authenticate the first command from the user device 101. In the case where the first communication is not valid (e.g., the message has been delayed), the authentication module 222 of the digital key lock 102 may not authenticate the first command from the user device 101.

At box 410, the process 400 includes performing the first operation, according to one embodiment of the present disclosure. In some embodiments, the digital key lock 102 can perform the operation based on the authentication provided by the authentication module 222. If the first command is authenticated by the authentication module 222, the digital key lock 102 may unlock the car. If the first command is not authenticated by the authentication module 222, the digital key lock 102 may not unlock the car. In particular embodiments, the first operation can be any form of security related command requested by the user device 101 and performed by the digital key lock 102.

At box 412, the process 400 includes receiving a second command to perform a second operation, according to one embodiment of the present disclosure. In particular embodiments, the digital key lock 102 can receive a second command, distinct from the first command, to perform the second operation. In various embodiments, the second command sent by the user device 101 is substantially similar to the first command sent by the user device 101. The second command may be sent at a later time than the first command, and the processes performed by the user device 101 and the digital key lock 102 are independent for each command.

At box 414, the process 400 includes determining if the second command is received within second maximum delay period, according to one embodiment of the present disclosure. In one or more embodiments, the second command is embedded into the second encrypted message 309. In various embodiments, the actions performed in box 414 are substantially similar to the actions performed in box 408 but for the second command. In some embodiments, the authentication module 222 calculates the second user device time difference 305 and the second digital key lock time difference 307 using Equations 5 and 6, respectively. In at least one embodiment, the authentication module 222 employs Equation 7 to evaluate is the second digital key lock time difference 307 is acceptable for accessing the secure environment.

At box 416, the process 400 includes performing the second operation, according to one embodiment of the present disclosure. In some embodiments, actions performed by the digital key lock 102 in box 416 are substantially similar to the action performed in box 410 but for the second command. For example, if Equation 7 is satisfied, the authentication module 222 will grant access to the secure environment. Continuing this example, if Equation 7 is not satisfied, the authentication module 222 will not grant access to the secure environment.

Figure 5:
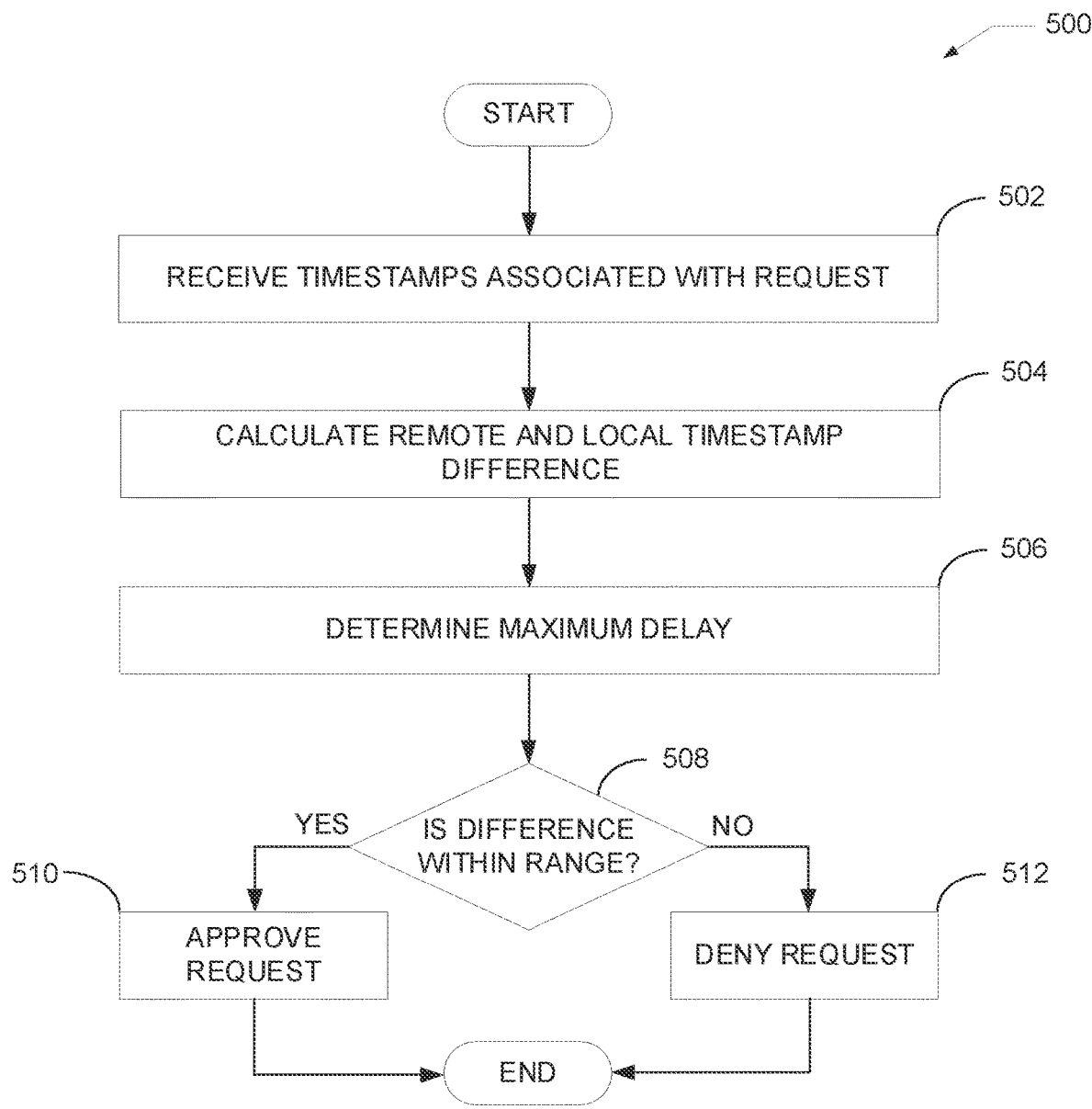
FIG. 5 illustrates a flowchart of a process for calculating a maximum delay, according to one embodiment of the present disclosure.

Referring now to FIG. 5, illustrated is a flowchart of the process 500, according to one embodiment of the present disclosure. In various embodiments, the process 500 generally relates to the procedure performed by the authentication module 222 of the digital key lock 102 for authenticating an encrypted message 308 and 309 and its corresponding command. In various embodiments, the digital key lock 102 can perform this operation after establishing and authenticating a wireless connection.

At box 502, the process 500 includes receiving timestamps associated with a request at the digital key lock 102. In one or more embodiments, the encryption module 221 of the digital key lock 102 receives the encrypted message 112 sent by the user device 101. In particular embodiments, the encrypted message 112 carries a command and timestamps for authenticating the communication. In some embodiments, the command includes a request for unlocking the digital key lock 102. The encryption module 221 of the digital key lock 102 may decrypt the message and send the timestamps to the authentication module 222 of the digital key lock 102.

At box 504, the process 500 includes calculating the remote timestamp difference and the local timestamp difference. In one or more embodiments, the remote timestamp difference is synonymous with the user device time difference 304 and the local timestamp difference is synonymous with the digital key lock time difference 306. In various embodiments, the authentication module 222 uses Equations 1 and 2 to calculate the remote timestamp and the local timestamp, respectively.

At box 506, the process 500 includes determining the maximum delay. In various embodiments, the maximum delay is denoted by the variable MaxDelay. Although depicted in sequential order, the box 506 may be performed any time before the operation of box 508. In some embodiments, the digital key lock 102 calculates or estimates the value MaxDelay. The digital key lock 102 may calculate the MaxDelay with the provided timestamps. In one or more embodiments, the variable MaxDelay is estimated using appropriate machine learning or statistical analysis techniques. When estimated, the digital key lock 102 may be pre-programmed with the variable MaxDelay before receiving an encrypted message 112.

At box 508, the process 500 includes evaluating timestamp differences. The authentication module 222 of the digital key lock 102 may use the local timestamp difference and the remote timestamp difference to authenticate the encrypted message 112 of the user device 101. In some embodiments, the authentication module 222 uses Equation 3 to grant or deny access to the secure environment. For example, if the local timestamp difference (e.g., user device time difference 304, second user device time difference 305) is less than or equal to the sum of the remote timestamp difference (e.g., digital key lock time difference 306, second digital key lock time difference 307) and the variable MaxDelay, then the process 500 can proceed to box 510. In an alternative example, if the local timestamp difference (e.g., user device time difference 304, second user device time difference 305) is greater than the sum of the remote timestamp difference (e.g., digital key lock time difference 306, second digital key lock time difference 307) and the variable MaxDelay, the process 500 can proceed to box 512. In particular embodiments, at box 510 the digital key lock 102 approves the encrypted message 112 and performs its corresponding request. For example, the authentication module 222 may grant access to the secure environment. In one or more embodiments, at box 512 the digital key lock 102 denies the encrypted message 112 and does not perform the request corresponding to the encrypted message 112. In other words, the digital key lock 102 fails validation of the encrypted message 112 and does not execute the instructions corresponding to command instructions of the encrypted message 112. For example, the authentication module 222 may deny access to the secure environment.

CONCLUSION

Aspects, features, and benefits of the systems, methods, processes, formulations, apparatuses, and products discussed herein will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described to explain the principles of the inventions and their practical application to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

From the foregoing, it will be understood that various aspects of the processes described herein are software processes that execute on computer systems that form parts of the system. Accordingly, it will be understood that various embodiments of the system described herein are generally implemented as specially configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media that can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data, which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A computer-implemented method comprising:
   establishing, by an operation device, a wireless communication link with a remote device;
   authenticating, by the operation device, the wireless communication link with the remote device;
   receiving, at the operation device, a first command to perform a first operation;
   establishing a first maximum delay period using an estimated time delay for transmitting messages between the remote device and the operation device, wherein the estimated time delay comprises an authentication delay, an encryption delay, or a combination thereof;
   determining, by the operation device, that the first command is received within a first maximum delay period;
   in response to determining that the first command is received within the first maximum delay period, performing, by the operation device, the first operation;
   receiving, at the operation device, a second command to perform a second operation;
   establishing a second maximum delay period using the estimated time delay;
   determining, by the operation device, that the second command is received within a second maximum delay period; and
   in response to determining that the second command is received within the second maximum delay period, performing, by the operation device, the second operation instructed in the second command.

2. The computer-implemented method of claim 1, wherein the first maximum delay period is further established by adding the estimated time delay to a first time difference of the remote device between an authentication timestamp of the remote device and a first command transmission timestamp of the remote device, wherein the authentication timestamp and the first command transmission timestamp are received at the operation device with the first command.

3. The computer-implemented method of claim 2, wherein the second maximum delay period is further established by adding the estimated time delay to a second time difference of the remote device between the authentication timestamp of the remote device and a second command transmission timestamp of the remote device, wherein the authentication timestamp and the second command transmission timestamp are received at the operation device with the second command.

4. The computer-implemented method of claim 3, wherein a first clock of the operation device that is used to determine that the first command is received within the first maximum delay period is asynchronous with a second clock of the remote device used to generate the authentication timestamp.

5. The computer-implemented method of claim 1, wherein the operation device comprises a digital key lock of a vehicle.

6. The computer-implemented method of claim 1, wherein the wireless communication link is established using Bluetooth Low Energy (BLE) communication protocols, ultra-wideband (UWB) communication protocols, Wi-Fi communication protocols, or a combination thereof.

7. The computer-implemented method of claim 1, wherein the first command and the second command are encrypted using a key agreement protocol established while authenticating the wireless communication link with the remote device.

8. The computer-implemented method of claim 7, wherein the key agreement protocol comprises a transport layer security (TLS) protocol, a secure socket layer (SSL) protocol, Hypertext Transfer Protocol Secure (HTTPS), a Noise protocol, Diffie-Hellman key exchange (Pure DH), RSA public-key cryptosystem, DHE, Elliptic-Curve Diffie-Hellman key exchange (ECDH), Pre-Shared Key (PSK), Secure Remote Password protocol (SRP), Elliptic-Curve Diffie-Hellman key exchange (ECDHE) or a combination thereof.

9. The computer-implemented method of claim 1, wherein the first command and the second command are transmitted during the same encryption session.

10. A system comprising:
a processor; and
a non-transitory, computer-readable medium comprising instructions that, when executed by the processor, cause the processor to:
establish a wireless communication link with a remote device;
authenticate the wireless communication link with the remote device;
receive a command to perform a first operation;
determine that the command is received after a maximum delay period; and
in response to determining that the command is received after the maximum delay period, fail the command.

11. The system of claim 10, wherein the instructions are further executable by the processor to cause the processor to:
in response to determining that the command is received after the maximum delay period, remove the wireless communication link with the remote device.

12. The system of claim 10, wherein failing the command comprises not executing command instructions provided in the command.

13. The system of claim 10, further comprising:
a digital key locking mechanism of a vehicle, wherein the digital key locking mechanism is configured to lock or unlock the vehicle in response to receiving the command within the maximum delay period.

14. The system of claim 10, wherein the instructions are further executable by the processor to cause the processor to:
establish the maximum delay period using an estimated time delay for receiving messages from the remote device, wherein the estimated time delay comprises an authentication delay, an encryption delay, or a combination thereof.

15. The system of claim 14, wherein the maximum delay period is further established by adding the estimated time delay for transmitting messages to a time difference of the remote device between an authentication timestamp of the remote device and a command transmission timestamp of the remote device, wherein the authentication timestamp and the command transmission timestamp are received with the command.

16. A non-transitory computer-readable medium having program code that is stored thereon, the program code executable by one or more processing devices for performing operations comprising:
establishing a wireless communication link with a remote device;
authenticating the wireless communication link with the remote device;
receiving a first command to perform a first operation;
determining that the first command is received after a first maximum delay period; and
in response to determining that the first command is received after the first maximum delay period, controlling performance of the first operation.

17. The non-transitory computer-readable medium of claim 16, wherein the operations further comprise:
receiving a second command to perform a second operation;
determining that the second command is received after a second maximum delay period; and
in response to determining that the second command is received after the second maximum delay period, failing the second command.

18. The non-transitory computer-readable medium of claim 17, wherein the operations further comprise:
establishing the first and second maximum delay periods using an estimated time delay for receiving messages from the remote device, wherein the estimated time delay comprises an authentication delay, an encryption delay, or a combination thereof.

19. The non-transitory computer-readable medium of claim 16, wherein the first command is encrypted using a key agreement protocol established while authenticating the wireless communication link with the remote device.

20. The non-transitory computer-readable medium of claim 16, wherein the operations further comprise:
establishing the first maximum delay period using an estimated time delay for receiving messages from the remote device and adding the estimated time delay for transmitting messages to a time difference of the remote device between an authentication timestamp of the remote device and a command transmission timestamp of the remote device, wherein the authentication timestamp and the command transmission timestamp are received with the first command.

\* \* \* \* \*